(12) United States Patent
Wirth

(10) Patent No.: US 8,495,866 B2
(45) Date of Patent: Jul. 30, 2013

(54) MIXING AND/OR EVAPORATION DEVICE AND RESPECTIVE MANUFACTURING METHOD

(75) Inventor: Georg Wirth, Kirchheim/Teck (DE)

(73) Assignee: J. Eberspaecher GmbH & Co., KG, Esslingen (DE)

( * ) Notice: Subject to any disclaimer, the term of this patent is extended or adjusted under 35 U.S.C. 154(b) by 1038 days.

(21) Appl. No.: 12/109,853

(22) Filed: Apr. 25, 2008

(65) Prior Publication Data
US 2008/0267780 A1 Oct. 30, 2008

(30) Foreign Application Priority Data

Apr. 25, 2007 (DE) .......................... 10 2007 019 878

(51) Int. Cl.
*F01N 3/00* (2006.01)
(52) U.S. Cl.
USPC ..................... 60/286; 60/295; 60/303; 60/324
(58) Field of Classification Search
USPC ............ 60/324, 286, 295, 301, 303; 123/590, 123/592; 48/189.4; 261/113
See application file for complete search history.

(56) References Cited

U.S. PATENT DOCUMENTS

| | | | |
|---|---|---|---|
| 4,515,138 A | 5/1985 | Agadi | |
| 4,848,920 A | 7/1989 | Heathe et al. | |
| 4,929,088 A * | 5/1990 | Smith | 366/337 |
| 6,431,528 B1 | 8/2002 | Kojima | |
| 6,536,420 B1 | 3/2003 | Cheng | |
| 6,837,213 B1 * | 1/2005 | Burnett | 123/306 |
| 7,128,049 B2 * | 10/2006 | Doucet | 123/306 |
| 7,434,658 B2 | 10/2008 | Staut | |
| 2003/0226539 A1 * | 12/2003 | Kim | 123/306 |
| 2008/0184700 A1 | 8/2008 | Harrer | |

FOREIGN PATENT DOCUMENTS

| | | |
|---|---|---|
| DE | 10144827 A1 | 3/2003 |
| DE | 10239417 A1 | 3/2004 |
| DE | 102006011890 A1 | 9/2007 |
| EP | 1371824 A1 | 12/2003 |
| EP | 1835139 A2 | 9/2007 |
| EP | 1657414 B1 | 8/2008 |
| EP | 1953359 A1 | 8/2008 |
| FR | 2384206 | 3/1978 |
| WO | 03/036054 A1 | 5/2003 |

OTHER PUBLICATIONS

European Search Report dated Feb. 13, 2009.
German Search Report dated May 2, 2008.

* cited by examiner

*Primary Examiner* — Thomas Denion
*Assistant Examiner* — Diem Tran
(74) *Attorney, Agent, or Firm* — Howard IP Law Group, PC

(57) ABSTRACT

The invention relates to a mixing and/or evaporation device for an exhaust system, an internal combustion engine, having a tubular body on whose one axial end are arranged several blades adjacent to one another in the circumferential direction, protruding radially inward and leaving free a central passage such that the blades are set at an angle to the axial direction. For inexpensive manufacturing, the tubular body may be manufactured from a single sheet metal body by shaping together with the blades.

13 Claims, 6 Drawing Sheets

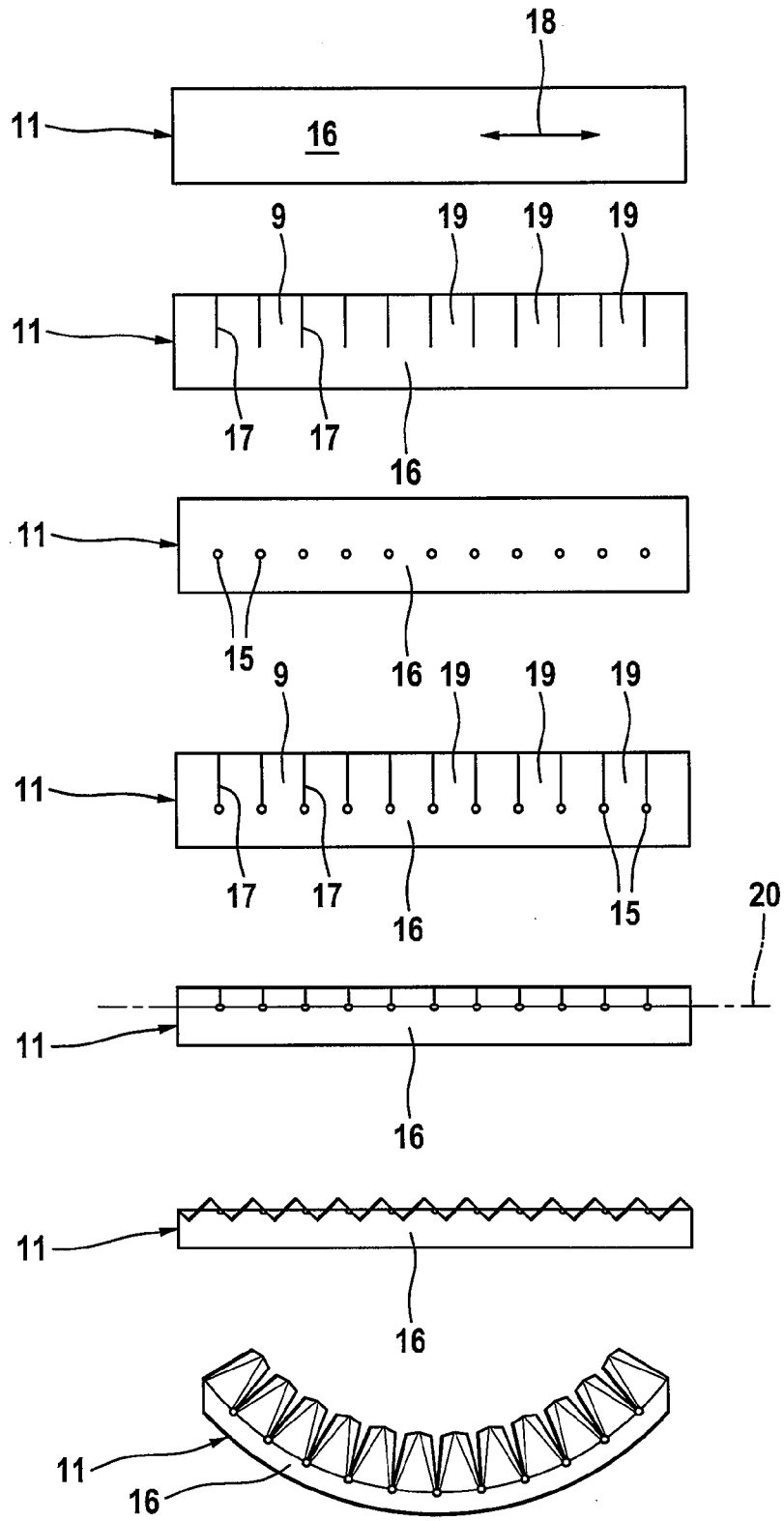

MIXING AND/OR EVAPORATION DEVICE AND RESPECTIVE MANUFACTURING METHOD

CLAIM OF PRIORITY

This application claims foreign priority of German Patent Application No. DE 10 2007 019 878.9, filed Apr. 25, 2007 in Germany, which application is hereby incorporated by reference in its entirety.

FIELD OF THE INVENTION

The present invention relates to a mixing and/or evaporation device for an exhaust system of an internal combustion engine. The invention also relates to a method for manufacturing such a mixing and/or evaporation device as well as an exhaust system equipped with such mixing and/or evaporation installation.

BACKGROUND OF THE INVENTION

In exhaust systems of internal combustion engines, it may be necessary for various reasons to spray a liquid educt into the exhaust stream. For example, fuel may be injected into the exhaust stream upstream from an oxidation catalyst to trigger an exothermic combustion reaction on a downstream oxidation catalyst. Likewise, a reducing agent such as ammonia, for example, may be sprayed into the exhaust stream to reduce nitrose gases entrained by the exhaust gas in a downstream SCR catalytic converter. Instead of ammonia, urea and/or an aqueous urea solution may also be injected into the exhaust stream. Then ammonia and water are formed from the aqueous urea solution by a hydrolysis reaction. Furthermore, a fuel or another suitable reducing agent may be injected into the exhaust stream upstream from an NOX storage catalyst to regenerate the NOX storage catalyst.

To improve and/or enable the efficiency of the educt injected in liquid form into the exhaust line, extensive evaporation is as desirable as is thorough mixing with the exhaust gas to thereby achieve the most homogeneous possible exhaust-gas-educt mixture. To do so, the exhaust system may be equipped with a mixing and/or evaporation installation arranged in the exhaust line downstream from the injection device.

Depending on the injection equipment used, the educt may be introduced in the form of a liquid jet which widens in a conical pattern. At low engine loads and exhaust gas temperatures, low exhaust gas temperatures and low velocities of flow prevail. The liquid jet may subsequently strike a corresponding structure of the mixing and/or evaporation installation. Depending on the design of the mixing and/or evaporation installation, the liquid jet may penetrate unhindered at least partially through the respective structure of the mixing and/or evaporation installation and then reach the exhaust gas treatment device in liquid form, in which device the sprayed liquid should arrive only in the form of the most homogeneous possible gas mixture. The result would be a reduced efficiency and the risk of damage.

SUMMARY OF THE INVENTION

The present invention relates to the problem of providing an improved embodiment for a mixing and/or evaporation device and/or an exhaust system equipped therewith and/or for a respective manufacturing method such that it is will be characterized in particular by inexpensive production. In addition, an improved evaporation effect would also be desirable.

The present invention is based on the general idea of manufacturing the mixing and/or evaporation installation or device from just one single sheet metal body on which to this end a tubular body may be designed and, protruding radially away from it toward the inside, blades. This makes it possible to manufacture the mixing and/or evaporation installation comparatively inexpensively. According to this invention, the blades are arranged and designed in a targeted manner in such a way that they leave a central passage open and are set at an angle to an axial direction of the tubular body. This increases the flow resistance in the area of the blades and creates a twist, while at the same time the pressure in the central opening is lowered. This makes it possible to create an acceleration of the exhaust flow at the center. The increased velocity of flow at the center promotes the evaporation of the liquid jet. It is advantageous here to orient the liquid jet in such a way that it strikes the blades radially outside of the central opening. A further embodiment in which the area of the blades provided for the liquid jet to strike them is designed to be opaque in the axial direction is also advantageous. To this end, the blades are designed and arranged, so that they overlap one another mutually in the circumferential direction to achieve the desired opaque area for impingement with the liquid jet.

It is self-evident that the features mentioned above and those yet to be explained below may be used not only in the particular combination indicated but also in other combinations or alone without going beyond the scope of the present invention.

Exemplary embodiments of the present invention are depicted in the drawings and explained in greater detail in the following description, where the same reference numerals refer to the same or similar or functionally identical components.

DETAILED DESCRIPTION FOR THE INVENTION

In schematic diagrams,

Figure 2:
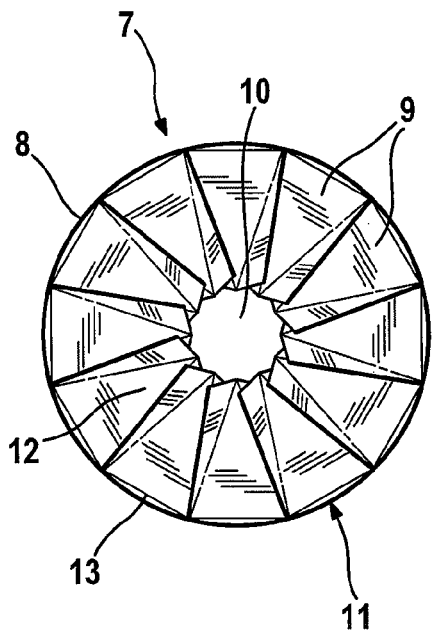
FIG. 2 shows an axial view of a mixing and/or evaporation installation.
Figure 3:
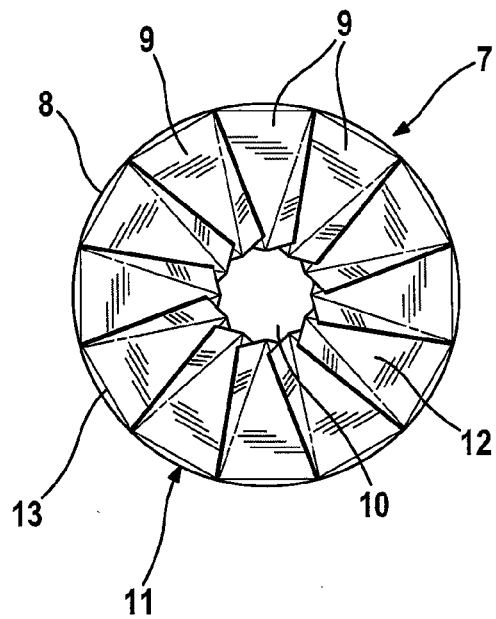
Figure 4:
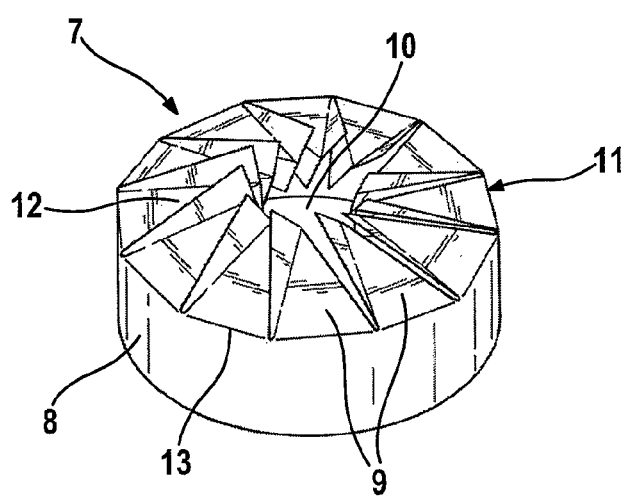
Figures 5A, 5B:
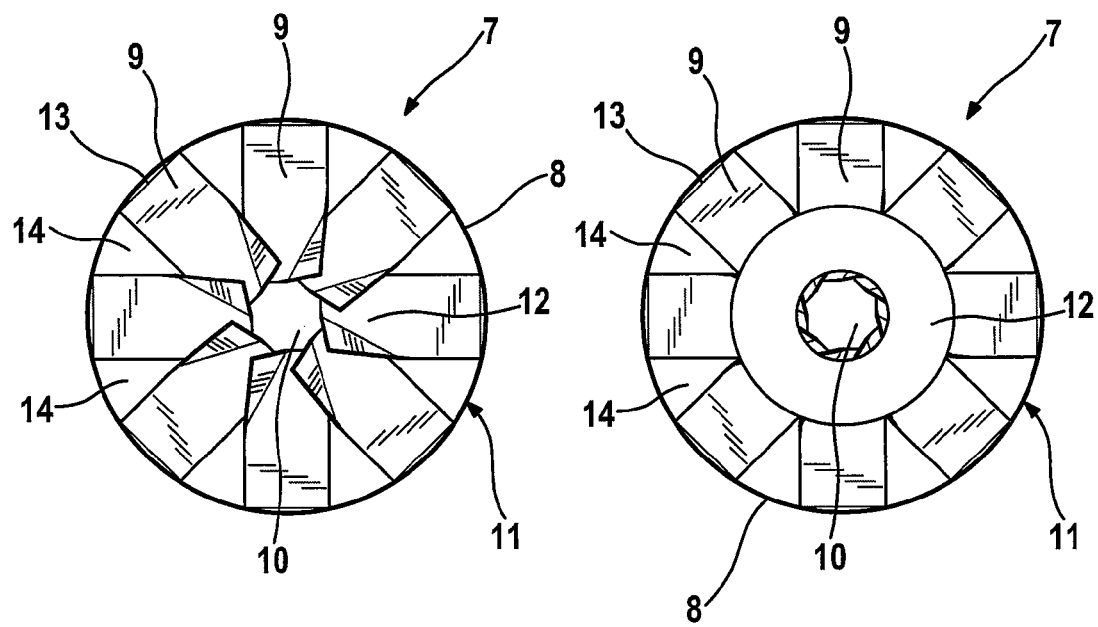
Figures 6A, 6B:
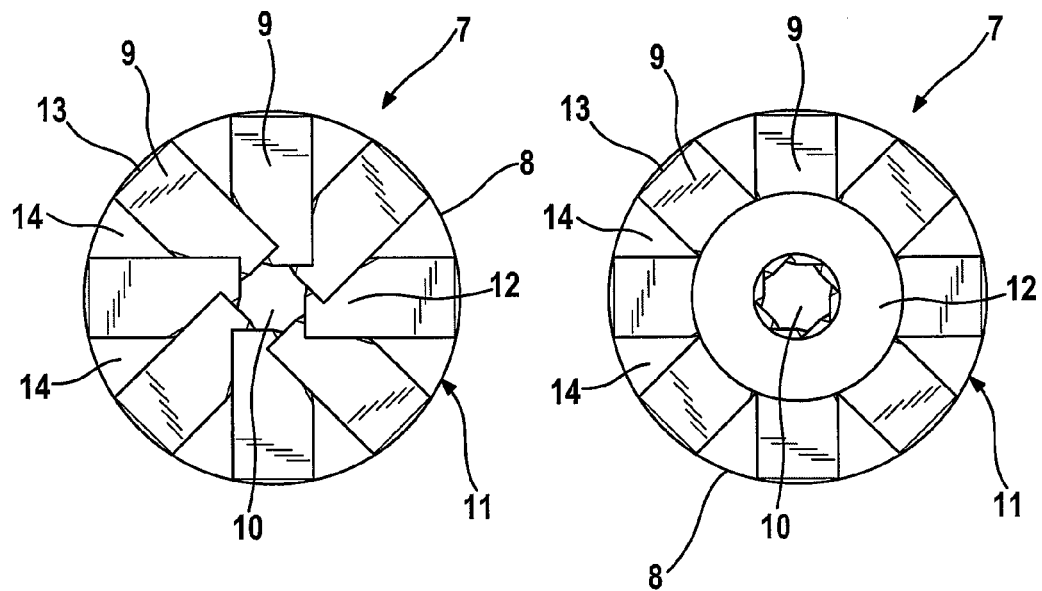
Figure 7:
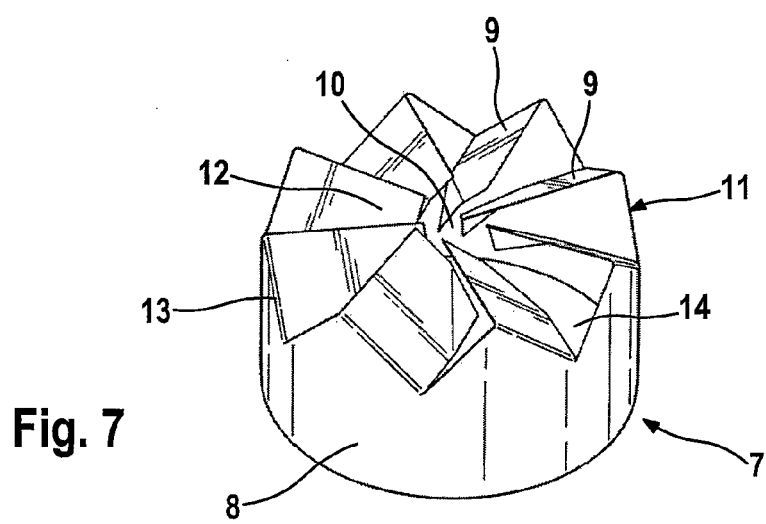

FIG. 3 shows an axial view like that in FIG. 2, but in the opposite direction of viewing, FIG. 4 shows a perspective view of the mixing and/or evaporation installation shown in FIGS. 2 and 3, FIG. 5a shows a view like that in FIG. 2, but of another embodiment, FIG. 5b shows a view like that in FIG. 5a, but with a ring area indicated symbolically, FIG. 6a shows a view like that in FIG. 3, but in the embodiment according to FIG. 5a, FIG. 6b shows a view like that in FIG. 6a, but with a ring area represented symbolically, FIG. 7 shows a perspective view of the mixing and/or evaporation installation of FIGS. 5 and 6, FIGS. 8a through 8g show views of a sheet metal body in various states as part of the production of a mixing and/or evaporation installation according to FIGS. 2 through 4, FIGS. 9a through 9d show views of a sheet metal body in various manufacturing stages of a mixing and/or evaporation installation according to FIGS. 5 through 7.

DETAILED DESCRIPTION OF THE INVENTION

Figure 1:
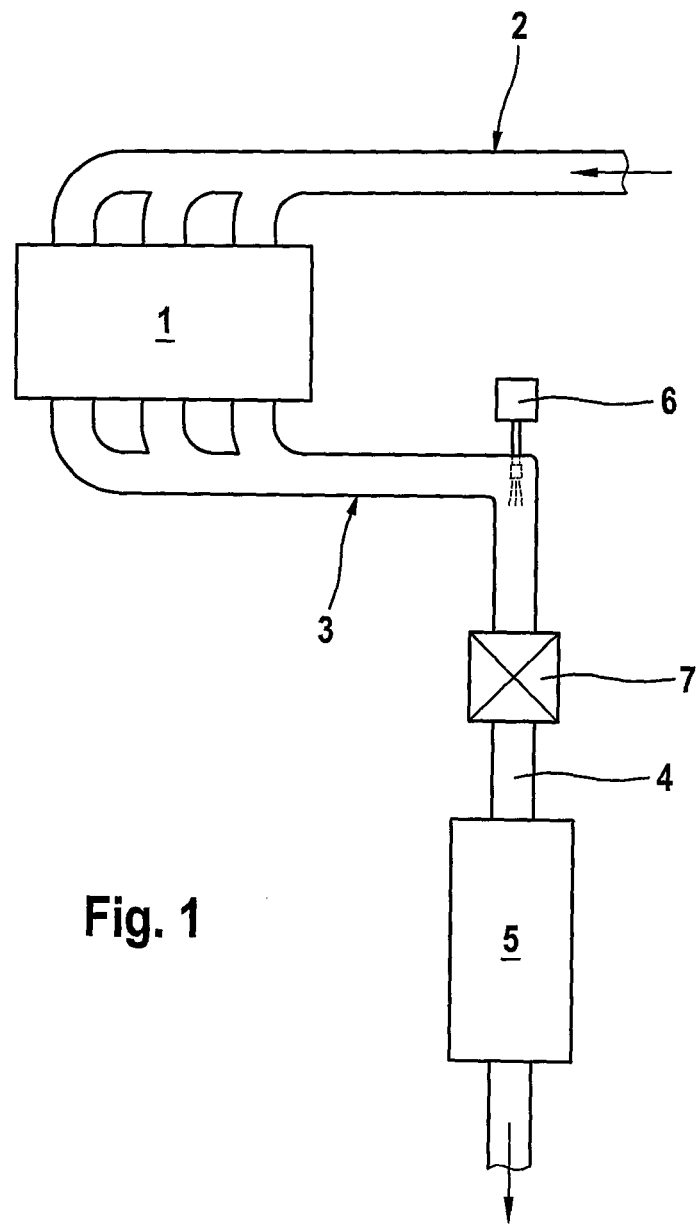
FIG. 1 shows a greatly simplified basic diagram of an exhaust system.

According to FIG. 1, an internal combustion engine 1, which may be installed in a motor vehicle, for example, has a fresh gas system 2 for supplying it with fresh gas, preferably air, and has an exhaust system 3 for removing the exhaust gas. Such an exhaust system 3 comprises an exhaust line 4 which removes the exhaust gas generated during operation of the internal combustion engine 1 from the internal combustion engine 1. The exhaust system 3 may have at least one exhaust gas treatment installation 5 which is arranged in the exhaust line 4. This exhaust gas treatment installation 5 may be, for example, an oxidation catalyst, an NOX storage catalyst, a hydrolysis reactor, an SCR catalytic converter or a particulate filter. Likewise, some or more of the aforementioned installations may be accommodated in a common housing, in particular in combination with a muffler. Furthermore, the exhaust system 3 has an injection device 6 which is designed for injecting a liquid educt into the exhaust line 4. The injection device 6 is preferably arranged on the exhaust line 4 upstream from the exhaust gas treatment installation or device 5. The liquid educt is preferably fuel, in particular the same fuel as that with which the internal combustion 1 is operated. Furthermore, the educt may also be ammonia or urea and/or an aqueous urea solution. If fuel injection is provided, then the next exhaust gas treatment device 5 directly downstream from the injection device 6 is preferably an oxidation catalyst on which the fuel is converted to heat, e.g., to heat the oxidation catalyst to its operating temperature or to heat a particulate filter arranged downstream from the oxidation catalyst to its regeneration temperature. If the injection device 6 is designed for injection of ammonia, then the exhaust gas treatment installation 5 may be an SCR catalytic converter. If urea or an aqueous urea solution is sprayed, the exhaust gas treatment installation 5 directly downstream may preferably be a hydrolysis reactor or a hydrolysis catalyst in which urea is converted to ammonia to impinge upon the downstream SCR catalytic converter. Likewise, the injection device 6 may also be followed directly by an exhaust gas treatment installation 5 designed as an SCR catalytic converter in which the hydrolysis reaction also takes place. In addition, any other applications for injection of a liquid educt into the exhaust line 4 directly downstream from an exhaust gas treatment device 5 would also be conceivable.

According to FIG. 1, an axial alignment of the educt stream is preferred for injection of educt, which is implemented by a corresponding bend in the exhaust line 4, for example.

To be able to evaporate the injected liquid educt in the exhaust gas as rapidly and as completely as possible and to mix the evaporated educt as homogeneously as possible with the exhaust gas, the exhaust system 3 is equipped with a mixing and/or evaporation installation or device 7 which is arranged in the exhaust line 4 downstream from the injection device 6 and is expediently arranged upstream or directly in or on the exhaust gas treatment device 5 next to the injection device 6.

Exemplary embodiments of the mixing and/or evaporation device 7 are explained in greater detail below with reference to FIGS. 2 through 7.

According to FIGS. 2 through 7, a mixing and/or evaporation installation 7 comprises a tubular body 8 which may be cylindrical in shape, especially circular cylindrical. On its axial ends, the tubular body 8 has a plurality of blades 9 which also form a component of the mixing and/or evaporation device 7. The blades 9 are arranged adjacent to one another in the circumferential direction and protrude radially inward away from the tubular body 8. The blades 9 are of such dimensions that they leave a central passage 10 free. Furthermore, the blades 9 are set at an angle with respect to the axial direction of the tubular body 8. In other words, each respective blade 9 has an oncoming flow edge and an outgoing flow edge which are spaced a distance away from one another with respect to the circumferential direction. Accordingly, the respective blades 9 have cross-sectional profiles with the longitudinal direction running at an angle to the axial direction. Due to the angular adjustment of the blades 9, a twist may be imposed on the flow when it passes through the mixing and/or evaporation device 7.

It is advantageous here that the respective tubular body 8 together with all the blades 9 is manufactured from a single sheet metal body 11, namely by shaping corresponding areas of this sheet metal body 11. Thus the respective mixing and/or evaporation device 7 is actually a sheet metal body manufactured from one piece of sheet metal.

With the exemplary embodiments shown here, the blades 9 are designed and arranged in such a way that they overlap mutually in the circumferential direction, namely in such a way as to form a ring area 12 which is opaque in the axial direction and surrounds the central passage 10. With the embodiments illustrated in FIGS. 2 through 4, the blades 9 are designed and arranged in such a way that the aforementioned opaque ring area 12 extends radially up to the ring body 8. Therefore in this embodiment, the opaque ring area 12 is bordered radially on the inside by the central passage 10 and radially on the outside by the tubular body 8.

To design such a opaque ring area 12, the blades 9 in the embodiment according to FIGS. 2 through 4 are each designed on the outside radially at a transition 13 to the tubular body 8 so that they lie with their cross-sectional profile in a plane there extending essentially perpendicularly to the axial direction of the tubular body 8. In this way, the neighboring blades 9 can overlap mutually from the central passage 10 to the tubular body 8. This mutual overlap in the axial direction leads to the desired opacity of the ring area 12 in the axial direction.

FIGS. 5 through 7 illustrate another embodiment of the mixing and/or evaporation device 7. In this embodiment, the blades 9 are arranged and designed to form axially free gaps 14 between the blades 9 which are adjacent to one another in the circumferential direction, outside of the opaque ring area 12. These gaps 14 are arranged around the opaque ring area 12 in the circumferential direction, so they are distributed in the circumferential direction where they create a relative pressure drop so that the mixing and/or evaporation installation 12 has a reduced flow resistance. The ring area 12 which is opaque in the axial direction is essentially bordered by the central passage 10 and on the outside radially by another ring area which extends up to the tubular body 8 and includes the gaps 14.

This design with the axially-free gaps 14 may preferably be achieved by the blades 9 being situated with their respective cross-sectional profiles in a plane inclined at an angle to a plane running perpendicular to the axial direction on the outside radially at the transition 13 to the tubular body 8. This inclination may be between 20° and 70°, for example. In the example shown here, this inclination is approximately 45°.

In the embodiments according to FIGS. 2 through 7, the blades 9 are designed so that their angular adjustment with respect to the axial direction varies radially along the respective blades 9. The change in the axial setting may be continuous, so that the blades 9 have a twist. Likewise, the change in the angular adjustment may take place in stages. To this end, partial areas within the respective blades 9 may be bent at an angle slightly with respect to the remainder of the respective blade 9. In a preferred embodiment here, the angular adjustment of the blades 9 decreases radially from the outside to the inside along the blades 9. In the ideal case, the blades 9 are not set at an angle on the inside radially, i.e., at the transition to the central passage 10 so that their cross-sectional profile there extends essentially parallel to the axial direction. The maximum angular adjustment then occurs on the outside radially in the area of the tubular body 8. This maximum angular adjustment is approximately 45° in the embodiment illustrated in FIGS. 5 through 7. In the embodiment illustrated in FIGS. 2 through 4, the blades 9 are set at an angle radially on the outside by a approximately 90° with respect to the axial direction.

To increase the fatigue limit of the mixing and/or evaporation device 7, the individual blades 9 adjacent to one another in the circumferential direction may border one another radially on the outside at the transition 13 to the tubular body 8 via a rounded opening 15. These rounded openings 15 can be seen in FIGS. 8c, 8d and 9c, 9d, for example. The rounded openings 15 serve to reduce stresses inside the sheet metal body 11 to reduce the risk of cracking.

An exemplary method for manufacturing the mixing and/or evaporation device 7 is described in greater detail below with reference to FIGS. 8 and 9.

According to FIG. 8a, the sheet metal body 11 of which the tubular body 8 and the blades 9 are formed by shaping, is essentially a flat strip of sheet metal 16 in the starting condition. Then according to FIG. 8b, cuts 17 are made in this sheet metal strip 16. The cuts 17 are started at the sides, but the cuts 17 do not go all the way through the sheet metal strip 16. The individual cuts 17 extend parallel to one another and are inclined with respect to the longitudinal direction of the sheet metal strip 16. The longitudinal direction of the sheet metal strip 16 is defined by the circumferential direction of the tubular body 8 formed with it. The longitudinal direction of the sheet metal strip 16 is symbolized by a double arrow and labeled as 18 in FIG. 8a.

Then optionally according to FIG. 8d, the rounded openings 15 may be cut in the sheet metal strip 16 in such a way that the openings 15 are each arranged on an end of one of the cuts 17. This makes it possible to reduce the risk of cracking at the respective cut end. As an alternative, it is also possible according to FIG. 8c to first cut the rounded openings 15 in the sheet metal strips 16 and only then make the cuts 17 according to FIG. 8d in such a way that they end in one of the openings 15. Likewise, it is fundamentally possible to create the cuts 17 and the openings 15 in the sheet metal strip 16 at the same time, e.g., in one punching operation.

Due to the cuts 17, a plurality of transverse strips 19 arranged side by side in the longitudinal direction 18 of the sheet metal strip 16 are formed on the sheet metal strip 16, these transverse strips being separated from one another by the cuts 17. These transverse strips 19 then later form the blades 9, which are already separated from one another here by the cuts 17. To provide the embodiment shown in FIGS. 2 through 4, the cuts 17 are made here in such a way that they extend across the longitudinal direction 18 of the sheet metal strip 16.

According to FIG. 8e, the separated blades 9 and/or the transverse strips 9 are then each bent about a bending axis 20 that runs perpendicular to the cuts 17 so that they protrude at a right angle away from the other sheet metal strip 16, for example. It is clear that other bending angles which are greater than or even smaller than 90° may also be possible here.

According to FIG. 8f, the bent and/or curved separated blades 9 and/or the transverse strips 19 may be equipped with a varying angle of pitch, e.g., the blades 9 may be twisted continuously for this purpose. Likewise, the blades 9 may be provided with varying angles of pitch in stages by bending at least one partial area on each.

Then according to FIG. 8g the sheet metal strip 16 may be bent and/or wound or rolled up around a bending axis running parallel to the axial direction of the tubular body 8 to form the tubular body 8 with the remaining sheet metal strip 16. For example, the sheet metal strip 16 may be welded to a joint, butt welded or welded in an overlap area. Likewise, other means of securing the sheet metal strips are also conceivable. After rolling up the strips according to FIG. 8g, then this yields the sheet metal body 11 shown in FIGS. 2 through 4.

Figure 9A:
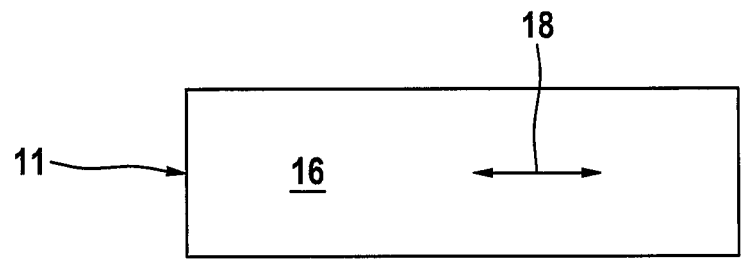
Figure 9B:
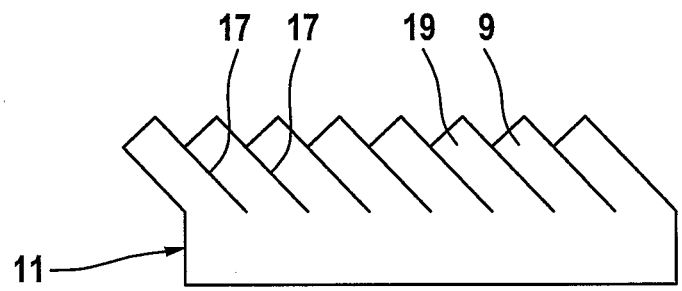
Figure 9C:
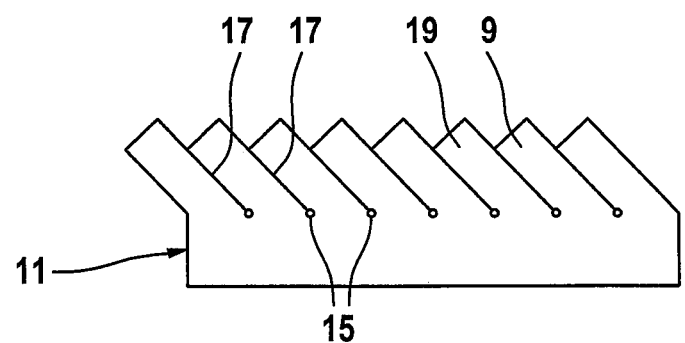

To manufacture the embodiments shown in FIGS. 5 through 7, the sheet metal strip 16 shown in FIG. 9a is cut according to FIG. 9e in such a way that the cuts extend at an angle of less than 90° to the longitudinal direction 18 of the sheet metal strip 16. For example, the cuts 17 extend here at an angle of approximately 45° to the longitudinal direction 18. Likewise, other angles of inclination, e.g., between 20° and 70°, are also conceivable. The inclined cuts 17 form a slope. Here again, it is possible according to FIG. 9c to mount the rounded openings 15 on the sheet metal strip 16 in such a way that the cuts 17 end in these openings 15. It is clear that by analogy with the procedure according to FIGS. 8a through 8g, the cuts 17 and the openings 15 may be introduced into the sheet metal strip 16 either simultaneously or in any order.

Figure 9D:
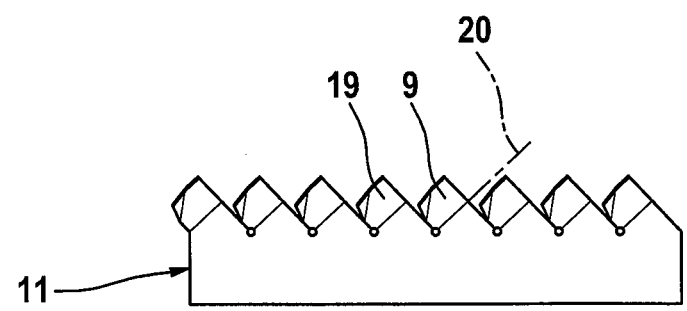

According to FIG. 9d, the separated transverse strips 19 and/or blades 9 are then bent again, with each individual blade 9 again being bent about a bending axis 20 that extends across the direction of the cut.

In this embodiment, after being bent, the blades 9 already have an angle of pitch with respect to the axial direction of the tubular body 8. In addition, the course of the angle of pitch may vary along the respective blade 9, e.g., by twisting or by a stepped change in the angle of pitch, e.g., by tilting at least a predetermined area within the blades 9. Then the sheet metal strip 16 formed in this way is rolled up to form the tubular body 8.

In the exhaust system 3 shown in FIG. 1, the injection device 6 and the mixing and/or evaporation device 7 may be coordinated with one another so that a single jet or multijet educt stream created by the injection device 6 strikes the blades 9 of the mixing and/or evaporation device 7 radially outside of the central passage 10. The educt stream may strike only within the opaque ring area 12 on the blades 9. The design and/or adjustment are expediently such that the respective educt stream strikes the blades 9 exclusively outside of the passage 10 and/or exclusively inside the opaque ring area 12.

The invention claimed is:
1. An exhaust system for an internal combustion engine, in a motor vehicle, said system comprising:
   an exhaust line carrying the exhaust gas away from the internal combustion engine;
   an injection device arranged on the exhaust line for spraying a liquid educt into the exhaust line; and
   a mixing device arranged downstream from the injection device, wherein said device comprises:
   a tubular body at whose one axial end are arranged several blades which are arranged adjacent to one another in the circumferential direction and protrude radially inward, leaving a central passage free,
      wherein the blades overlap in the circumferential direction and are set at an angle to the axial direction forming a continuous ring that is opaque in the axial direction and surrounds the central passage,
   wherein the tubular body together with the blades is manufactured from a continuous single sheet metal body by shaping, and wherein the blades that are adjacent in the circumferential direction border one another on the outside radially at the transition to the tubular body via a respective rounded opening.

2. The exhaust system according to claim 1, wherein the injection device and the mixing device are coordinated with one another so that the injection device generates an educt stream which strikes the blades radially outside of the central passage.

3. The exhaust system according to claim 1, wherein the injection device and the mixing device are coordinated with one another in such a way that the injection device creates an educt stream that strikes the blades within the opaque ring area.

4. The exhaust system according to claim 1, wherein the blades are arranged so that free gaps are formed axially between neighboring blades in the circumferential direction on the outside radially of the opaque ring area.

5. A mixing device for an exhaust system of an internal combustion engine, said device comprising:
- a tubular body at whose one axial end are arranged several blades which are arranged adjacent to one another in the circumferential direction and protrude radially inward, leaving a central passage free,
  - wherein the blades are set at an angle to the axial direction and adjacent blades overlap in the circumferential direction, thereby defining a continuous ring that is opaque in the axial direction and that surrounds the central passage,
- wherein the tubular body together with the blades is manufactured from a single sheet metal body by shaping, and
- wherein the blades that are adjacent in the circumferential direction border one another on the outside radially at the transition to the tubular body via a respective rounded opening.

6. The device according to claim 5,
wherein the blades are arranged so that free gaps are formed axially between neighboring blades in the circumferential direction on the outside radially of the opaque ring area.

7. The device according to claim 5, wherein the blades are situated with their profile in a plane which is inclined with respect to a plane running perpendicular to the axial direction.

8. The device according to claim 5, wherein the sheet metal body is a sheet metal strip from which the blades are separated from one another by parallel cuts inclined with respect to the longitudinal direction of the sheet metal strip and are bent about a bending axis that runs perpendicular to the cuts with respect to the blades that have been separated.

9. The device according to claim 5, wherein the continuous opaque ring has a circumference, and wherein the ring is configured to obstruct the flow of exhaust gas in the axial direction about the circumference of the ring.

10. The device according to claim 5, wherein the blades are arranged so that the opaque ring area extends radially up to the ring body.

11. The device according to claim 10, wherein the blades are situated radially on the outside at the transition to the tubular body with their profile in a plane extending perpendicular to the axial direction.

12. The device according to claim 5, wherein the blades have an angle of pitch with respect to the axial direction that is variable in steps or continuously in the radial direction along the blades.

13. The device according to claim 12, wherein the angle of pitch decreases radially from the outside to the inside along the respective blade.

* * * * *